United States Patent [19]

Gaines

[11] 4,091,191

[45] May 23, 1978

[54] BATTERY HAVING AN ELECTRODE COMPRISING MIXTURES OF Al AND TiS$_2$

[75] Inventor: Lewis H. Gaines, Allentown, Pa.

[73] Assignee: Exxon Research & Engineering Co., Linden, N.J.

[21] Appl. No.: 804,575

[22] Filed: Jun. 8, 1977

Related U.S. Application Data

[63] Continuation of Ser. No. 751,899, Dec. 17, 1976, abandoned, which is a continuation of Ser. No. 605,076, Aug. 15, 1975, abandoned.

[51] Int. Cl.$^2$ .............................................. H01M 6/14
[52] U.S. Cl. .................................................... 429/194
[58] Field of Search .................. 429/194, 197, 191–193

[56] References Cited

U.S. PATENT DOCUMENTS

| | | | |
|---|---|---|---|
| 3,644,145 | 2/1972 | Fraioli et al. | 429/102 |
| 3,749,607 | 7/1973 | Jasinski et al. | 429/194 |
| 3,791,867 | 2/1974 | Broadhead et al. | 429/191 |
| 3,864,167 | 2/1975 | Broadhead et al. | 429/194 |
| 3,877,983 | 4/1975 | Hovsepian | 429/194 |
| 3,933,520 | 1/1976 | Gay et al. | 429/103 |

Primary Examiner—Charles F. LeFevour
Attorney, Agent, or Firm—Joseph J. Dvorak

[57] ABSTRACT

An improved rechargeable, high energy density electrochemical cell comprises an anode, an electrolyte of an ionic salt dissolved in an aprotic organic solvent and a composite cathode structure of a cathode-active material and a metal, the metal being reactive with the cathode-active material to form on the metal an impervious conductive film of a mixture of compounds of the cathode-active material and the metal, which film remains impervious during both charging and discharging. A specific example includes a rechargeable, high energy density battery consisting of a lithium anode, an electrolyte of lithium perchlorate dissolved in dioxolane, and a cathode of titanium disulfide and aluminum.

7 Claims, 1 Drawing Figure

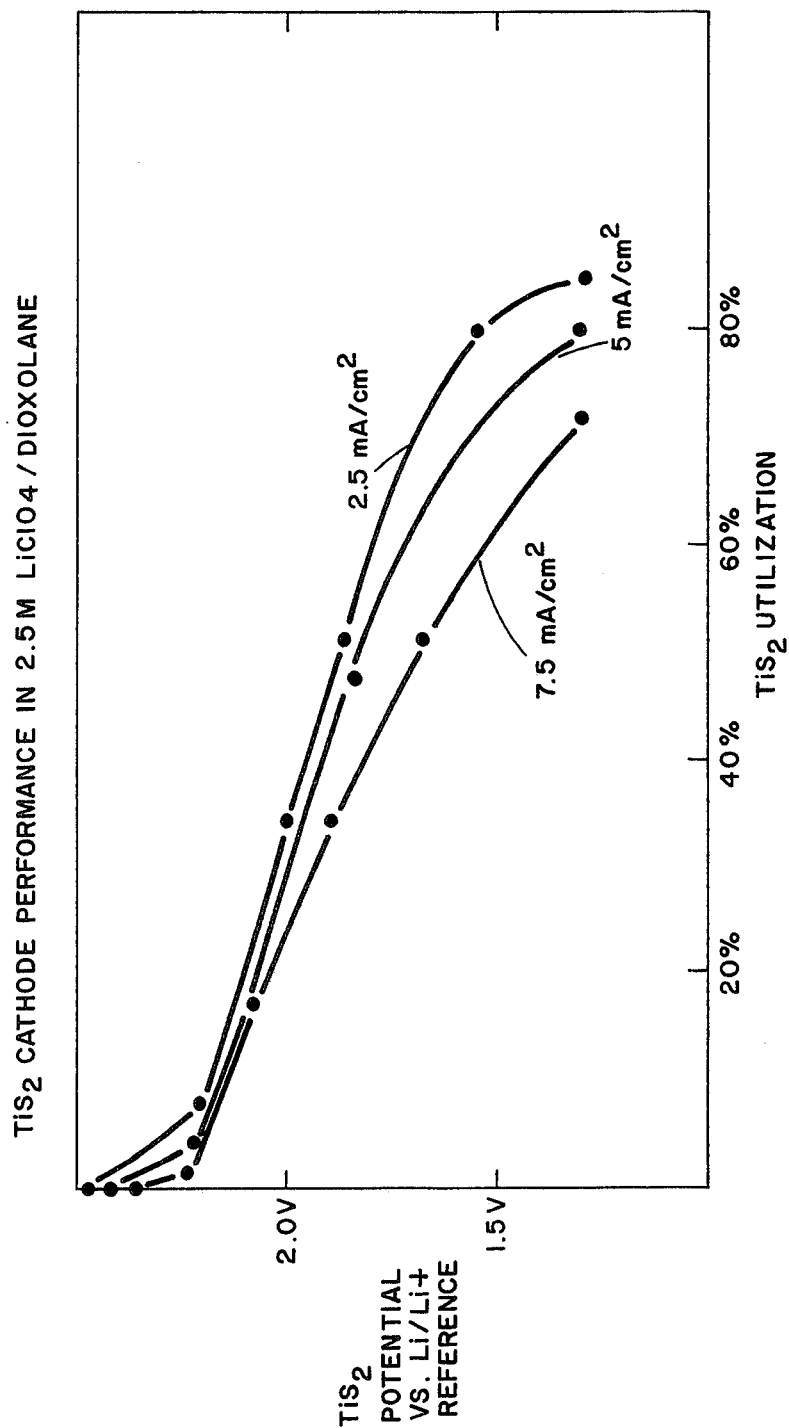

BATTERY HAVING AN ELECTRODE COMPRISING MIXTURES OF Al AND TiS$_2$

This is a continuation of application Ser. No. 751,899, filed Dec. 17, 1976 now abandoned, which in turn is a continuation of application Ser. No. 605,076, filed Aug. 15, 1975 and now abandoned.

BACKGROUND OF THE INVENTION

The present invention relates to electrochemical cells and more particularly to a rechargeable cell that has an improved cathode structure.

Recent developments in high energy density cells have focused attention on anodes of alkali metals, particularly lithium, nonaqueous electrolytes and cathode-active materials of nonstoichiometric compounds. Alkali metals, particularly lithium, are used as anode-active materials because they are highly electronegative, thereby providing high energies per weight unit. Self-discharge of electrochemical cells employing alkali metals as the anode-active material is minimized by employing nonaqueous solvents which are not reducible by the highly reactive anode materials. The choice of cathode material is frequently the compromise of a number of factors. Much attention has been directed to layered nonstoichiometric compounds which are solid, significantly oxidizing, react with the ions of alkali metals without substantial structural changes, and are electronically conductive.

Although the nonstoichiometric compounds possess many of the characteristics preferred for the cathode materials, problems still remain. The current generating electrochemical reactions in electrochemical cells employing nonstoichiometric compounds as the cathode-active material are dependent upon surface area and it is difficult to prepare structurally sound cathodes without materially decreasing the accessibility of the electrolyte to the cathode-active material. Moreover, although the nonstoichiometric compounds are electronic conductors, their conductivity is not nearly as great as metallic conductors. In order to overcome these problems as well as others, it has been suggested to provide the cathode structure by incorporating a noncorroding electrochemically inactive binder such as polytetrafluoroethylene, or to improve the conductivity of the cathode structure by mixing particulate graphite with the cathode-active material. The general application of graphite and carbon materials as conductive elements is restricted since graphite has only a moderately high conductivity and since fabricated forms of these materials, such as fibers, are costly and have relatively poor mechanical properties. The choice of metallic structural members and fibers for binding and contacting the cathode-active material is restricted in high energy density, secondary electrochemical cells because thermodynamic considerations indicate that many useful metallic materials will corrode under the highly oxidizing conditions experienced during charging to the high cut-off potentials that are implicit in high energy density cells.

BRIEF DESCRIPTION OF THE INVENTION

Generally speaking, the present invention relates to rechargeable, high energy density electrochemical cells. The cells include a highly electronegative anode-active material, an electrolyte of an aprotic organic solvent having dissolved therein ionizable salts, and a composite cathode structure. The composite cathode structure consists essentially of a cathode-active material and a metal, the metal being reactive with at least one component of the cathode active material to form on the surface of the metal an impervious conductive film of a mixture of compounds of the cathode-active material and the metal which film remains impervious during discharge-charge cycling.

DESCRIPTION OF THE DRAWING

The drawing is a graph showing the cathode polarization versus a lithium reference electrode of an actual cathode in accordance with the present invention.

DETAILED DESCRIPTION

High energy levels in electrochemical cells are achieved by using anode-cathode couples having the greatest difference in their electrochemical potentials. High energy density cells rely on the same considerations, but impose the additional constraint that the couple components must be comparatively light. Use of alkali metals, particularly lithium, as the anode-active material satisfies these criteria for the anode portion of the couple. The use of alkali metals as the anode-active materials dictates the use of nonaqueous electrolytes because the reactivity of the alkali metals prohibit their use in conjunction with aqueous electrolytes. The choice of the cathode-active material is not as clear as the most electropositive elements are gaseous or liquid and cannot be easily incorporated in a rechargeable cell. Thus, the search for cathode-active materials has centered about nonstoichiometric compounds which are comparatively electropositive, relatively light, electronic conductors and structurally stable in the course of charging and discharging. Nonstoichiometric compounds are not easily fabricated into sound, electrically conductive cathode structures. The present invention solves these problems by using metallic structural members, e.g., current collectors, cell containers, powders and/or reinforcing fibers, which metal forms an electrically conductive, impervious compound which has a decomposition potential below that reached during cell discharge. Other metals which form compounds whose thermodynamic decomposition voltages are above the cell discharge voltage are also suitable if kinetic effects, such as activation overpotential, render them inert to normal cell voltages. Any anode-active material can be used in conjunction with the compounded cathode of the present invention. It is preferred, however, to employ alkali metals or alloys thereof, particularly lithium, as the anode-active material. Alkali metals are highly electronegative and can impart high energy levels to the electrochemical cell. Lithium is particularly preferred because it is the most electronegative element and it is the lightest of the alkali metals, which properties when combined enable the establishment of high energy density cells. As used herein, "alkali metals" include lithium, sodium, potassium and alloys thereof.

The cathode-active material is a solid that is oxidizing and structurally stable during charging and discharging. Nonstoichiometric compounds are particularly attractive as cathode-active materials because the nonstoichiometric nature of the compounds allows the acceptance and rejection of the ions of the anode-active material with only an expansion or contraction of one or more lattice parameters occurring. Nonstoichiometric compounds frequently have layered structures which impart greater conductivity to the material, thereby enhancing these materials as cathode-active materials.

Examples of nonstoichiometric cathode-active materials include titanium disulfide, titanium trisulfide, niobium trisulfide, niobium triselenide, tantalum triselenide and tantalum trisulfide. Titanium disulfide is particularly advantageous from the standpoint of electrochemical and physical properties, availability and cost. Other reversible cathode materials may also be used in accordance with the present invention if the requirements of the stability of the reaction product of the metal and the cathode material are met.

The electrolyte comprises an ionic salt of the anode-active material dissolved in an aprotic organic solvent. The organic solvent must dissolve appreciable amounts of the ionic salts of the anode-active material, be inert to both the anode and cathode-active materials, and be chemically stable itself. Suitable aprotic organic solvents are tetrahydrofuran, dioxolane, dimethyoxyethane, propylene carbonate, butyrolactone and mixtures thereof. Although liquid electrolytes are preferred, solid electrolytes can also be used with the cathode structure of the present invention.

Ionic salt materials are dissolved in a solvent to carry current through the electrolyte. The ionic salts are advantageously salts of the anode-active material. Cations in addition to the ions of the anode-active material can also be incorporated in the electolyte to increase the current carrying capacity of the electrolyte, thereby minimizing potential drops through the electrolyte. In most instances, the electrolyte should contain at least about 0.5 mole per liter (M/l) and advantageously between about 1.0 and 3 M/l. The choice of the particular salt employed is dependent upon many factors including chemical stability, chemical inertness to the solvent, and to the protective layer on the metallic structural member. When using titanium disulfide cathode-active material, lithium anodes and dioxolane solvents, lithium perchlorate in concentrations between about 1.5 M/l and 2.5 M/l is advantageously employed.

An important aspect of the present invention is the use of certain metals as contacts, current collectors, cell containers, and reinforcing members in the cathode structure of secondary batteries. Use of metallic structural members insures increased overall cathode efficiency due to the improved conductivity of the cathode, the increased structural stability and the ease of withdrawal of current from the electrode to external devices. The use of many metallic cathode structure members for rechargeable electrochemical cells initially appears thermodynamically impossible. The reverse potentials that must be employed for charging, particularly for high energy density cells, should cause the metallic structures to electrochemically corrode. The present invention relies on the discovery that those metals which react with at least one component of the cathode-active material to form, either during processing or during charging or discharging of the cell, an electrically conducting, impervious film, can be employed for cathode structural members in high energy density cells. The metals should be readily available, inexpensive and lightweight. Metals that can be used in accordance with the present invention include magnesium, aluminum, titanium, zinc, lead, iron, nickel and alloys thereof. As noted hereinabove, metals selected in accordance with the present invention for use as cathode structural members in secondary cells must react with the cathode-active material, during cell construction or operation, to form an impervious film on the surface of the metal. The film should be adherent, stable in the presence of the selected dissolved salt, impervious to the electrolyte, and should not materially lower the conductivity of the metal. The film must protect the underlying metal not only when the cell is being stored but also when the cell is being discharged and charged. During discharge, the cathode structure is subjected to reducing conditions which may not be unduly corrosive to the metal but can be destructive of the protective film. The cathode structure is subjected to strongly oxidizing conditions during charging. Under oxidizing conditions, the metallic structure is highly susceptible to electrochemical corrosion and it is the impervious film that protects the metallic structure during charging. The impervious film must therefore withstand chemical attack under neutral, reducing and oxidizing conditions, once formed it cannot permit further reaction between the metal and the cathode-active material, and it must not significantly lower the conductivity of the metallic structure.

In carrying the present invention into practice, it is preferred to manufacture the structural members of aluminum and alloys thereof. Aluminum has a number of desirable properties including good electrical conductivity, lightness in weight, good workability, ready availability, and inexpensiveness. In use with titanium disulfide, for example, an adherent impervious film containing aluminum, titanium and sulfur forms on the aluminum, which film is nonreactive with most nonaqueous electrolytes. Aluminum and its alloys can be used as current collectors, contacts, cell containers, structural members, and additive powders. Fibers of aluminum or its alloys can be mixed with the cathode-active material to impart greater structural stability to the cathode structure. For lightweight cells, the aluminum may be deposited onto conductive plastic substrate materials.

Composite cathodes of the present invention can be prepared by techniques known in the art. Particulate cathode-active material, for example, can be mixed with a plastic binder, such as polyethylene, polytetrafluoroethylene and/or ethylcellulose, and then pressed onto a perforated sheet of a metal in accordance with the present invention. Alternatively, a mixture of the cathode-active material and a particulate form (e.g., powder or fibers) of a metal in accordance with the present invention can be molded into the desired shape optionally about a perforated metal sheet or a metal screen. When a perforated metal sheet or metal screen is used for current collecting purposes, leads for external circuit connections are advantageously fastened directly to such sheet or screen.

When employing particulate forms of metal with the cathode-active material to provide increased cathode structural integrity and improved current collecting capacity, the particulate metal is added in amounts up to about 50%, by weight, advantageously in amounts between about 5% and 20% by weight. The binder, if desired, is added in amounts between about 1% and 20%, by weight, advantageously between about 2% and 10%. The cathode-active material, the particulate metal, and the binder are thoroughly mixed and then molded into a desired shape by pressing a pressure up to 24,000 pounds per square inch. The maximum pressure limit is determined by the flow properties of the electrode paste and by the minimum porosity which will result in acceptable rate capability.

A particularly advantageous embodiment of a rechargeable, high energy density electrochemical cell employing the metallic cathode structural members of the present invention will now be described. The anode-active material comprises lithium or alloys thereof. The anode structure can use nickel, iron or steel for current collectors, contacts and the like. The cathode-active material is finely divided, stoichiometric titanium disulfide. The finely divided titanium disulfide can be mixed with up to about 50%, by weight, aluminum fibers and pressed into a composite cathode about a perforated aluminum collector plate. The electrochemical cell is completed by the addition of a nonaqueous electrolyte of an ionizable lithium salt, preferably lithium perchlorate dissolved in an amount between about 1 M/l and 2.5 M/l in an aprotic solvent such as tetrahydrofuran, dioxolane, dimethyoxyethane, and mixtures thereof.

In order to give those skilled in the art a greater appreciation of the advantages of the present invention, the following illustrative examples are given:

EXAMPLE 1

An electrochemical cell was constructed using a cathode comprising 0.78 grams (187 ma-hr) of finely divided $TiS_2$ and 0.08 grams aluminum fibers (0.09 cm in diameter and about 0.6 cm in length). The dry cathode mixture was pressed at 15,000 psi on a 1 square inch piece of expanded aluminum mesh having perforations approximately 0.5 cm × 0.2 cm. The aluminum mesh was extended to permit electrical connections to be made to the cathode. The negative electrodes comprised layers of 0.08 cm thick lithium metal foil bonded to a nickel mesh. The nickel mesh was extended in a similar fashion. The separator comprised a layer of an inorganic porous material and a layer of a porous polypropylene material with a total thickness of 0.07 cm. The cell was inserted into a leak tight container and wet down with an electrolyte of 2.5 M $LiClO_4$ in dioxolane. The cell was discharged at constant current density to a final voltage of 1.25 V. The initial open circuit voltage was 2.55 V. Charges were performed using currents of 2.5 ma/cm$^2$ and 0.3 ma/cm$^2$ to a limit of 2.60 V. Cathode polarizations are reported using a lithium reference electrode. The first three cycles are shown in the figure. The aluminum grid showed no significant weight change after cycling. Microscopic examination showed no apparent structural change or surface etching.

EXAMPLE 2

An electrochemical cell similar in construction to that in Example 1 was constructed using an aluminum cathode grid as a support for cathode containing 0.82 grams $TiS_2$ and 0.03 grams plastic binder. The cell was cycled 4 times using a discharge cutoff of 1.25 V and a charge limit of 2.6 V. The current densities were 10 ma/cm$^2$ for discharge and 2.5 ma/cm$^2$ and .3 ma/cm$^2$ for charge. After cycling, the $TiS_2$ was stripped off the aluminum grid by mechanical means. The grid was well cleaned using dioxolane as a scrubbing vehicle. The surface state of the Al was determined using x-ray fluorescense in combination with scanning electron microscopy. The analysis shows a substantially uniform layer of compounds of Ti, Al and S existing over the metal surface.

What is claimed is:

1. A secondary electrochemical cell which comprises an alkali metal anode and a cathode immersed in an aprotic organic solvent having an alkali metal salt dissolved therein, the improvement which comprises: a composite cathode structure of a cathode-active material and a metal, wherein said cathode-active material consists essentially of at least one member selected from the group consisting of titanium disulfide, niobium trisulfide, titanium trisulfide, niobium triselenide, tantalum triselenide and tantalum trisulfide, and wherein said metal is at least one member selected from the group consisting of magnesium, aluminum, titanium, zinc, lead, iron, nickel and alloys thereof, said metal being reactive with the cathode-active material to form on the metal an impervious conductive film of a mixture of compounds of the cathode-active material and the metal which film remains impervious during both charging and discharging.

2. The electrochemical cell as described in claim 1 wherein the cathode active material is titanium disulfide and the metal is aluminum.

3. The electrochemical cell as described in claim 2 wherein the aluminum is a perforated sheet upon which the titanium disulfide is pressed.

4. The electrochemical cell as described in claim 2 wherein the aluminum is a screen upon which the titanium disulfide is pressed.

5. The electrochemical cell described in claim 2 wherein the aluminum is particulate and is mixed with the titanium disulfide.

6. The electrochemical cell described in claim 5 wherein the particulate aluminum is added to the titanium disulfide in amounts up to about 50% by weight.

7. The electrochemical cell as described in claim 5 wherein the particulate aluminum is added to the titanium disulfide in an amount between about 5%, and 20%, by weight.

* * * * *